(No Model.) 4 Sheets—Sheet 1.
D. CURELL.
CASH RECORDER AND CHECK PRINTER.
No. 499,660. Patented June 13, 1893.
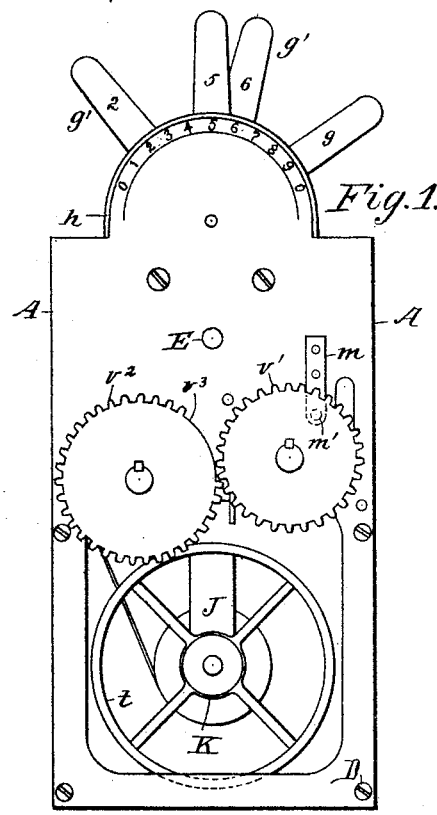
Fig. 1.
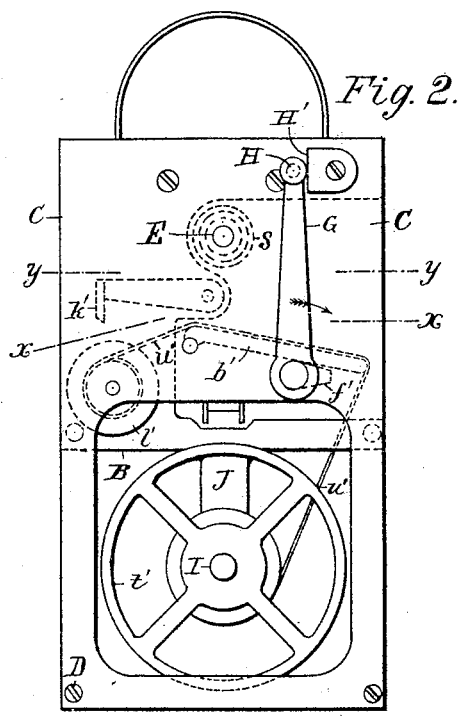
Fig. 2.
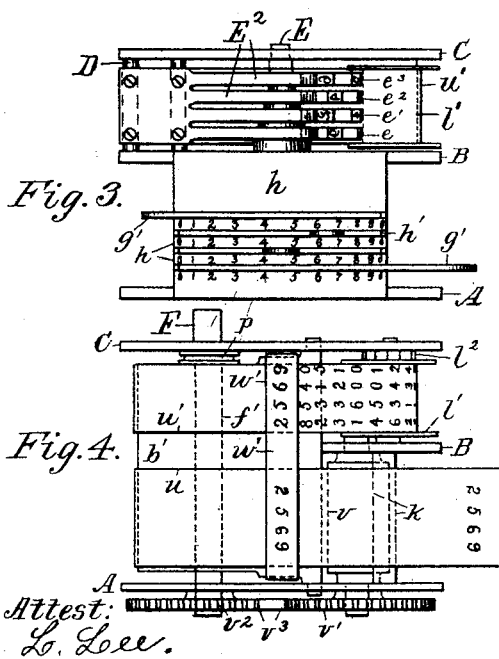
Fig. 3.
Fig. 4.
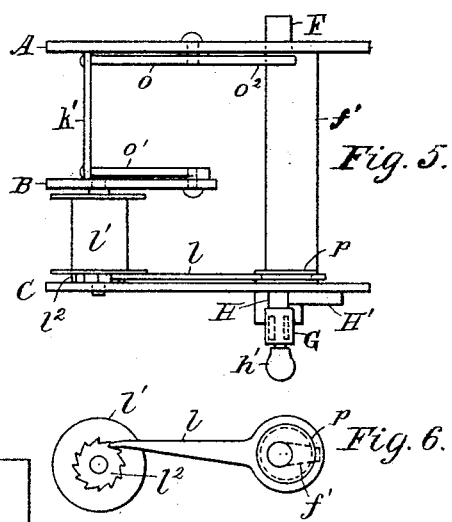
Fig. 5.
Fig. 6.
Attest:
L. Lee.
Edw. F. Kinsey.
Inventor:
D. Curell, per
Crane & Miller, attys.

(No Model.) 4 Sheets—Sheet 2.
D. CURELL.
CASH RECORDER AND CHECK PRINTER.

No. 499,660. Patented June 13, 1893.

Attest:
L. Lee.
Edw. F. Kinsey.

Inventor.
D. Curell, per
Crane & Miller, attys (No Model.) 4 Sheets—Sheet 3.
D. CURELL.
CASH RECORDER AND CHECK PRINTER.
No. 499,660. Patented June 13, 1893.
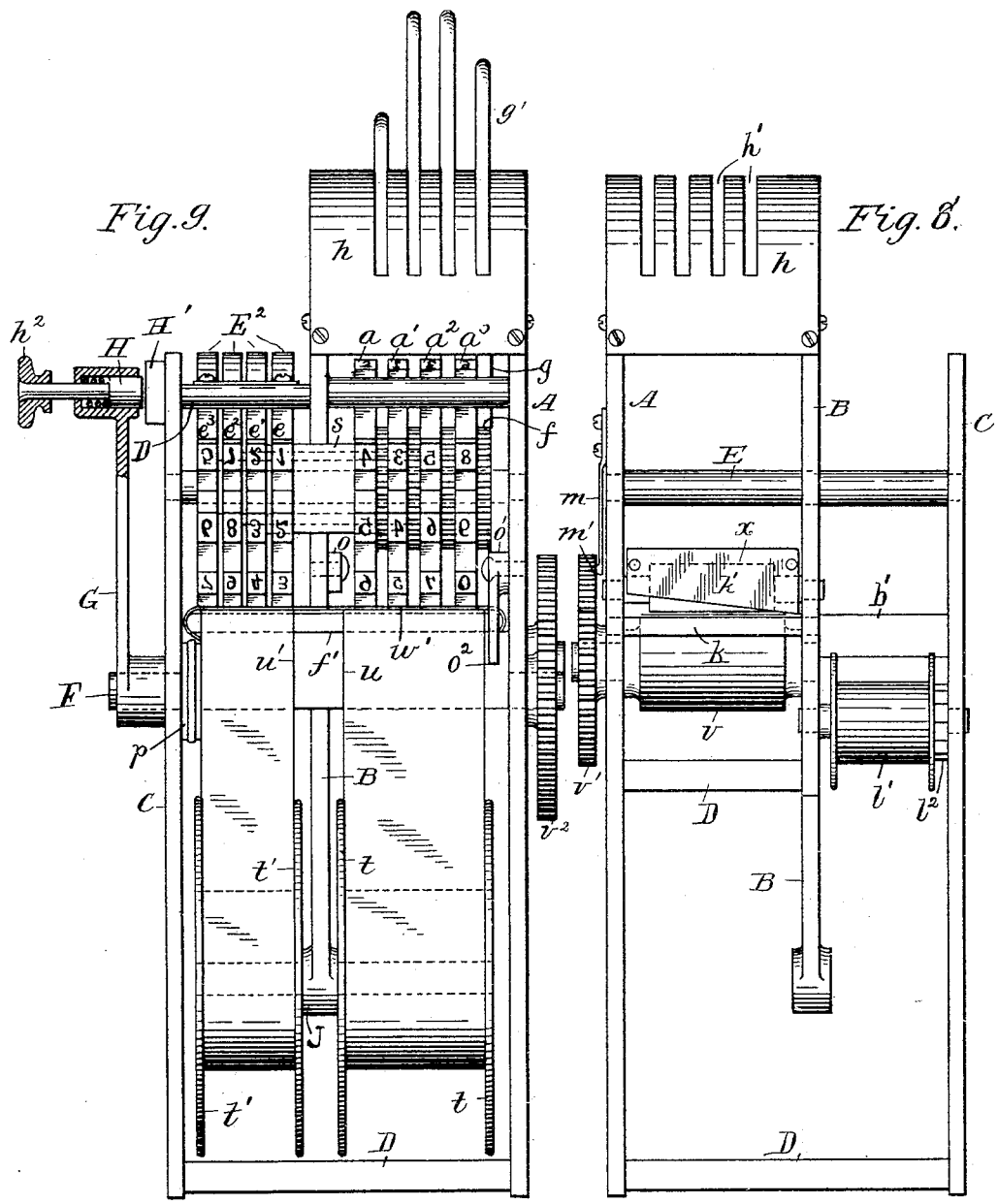
Attest:
L. Lee.
Edw. F. Kinsey.
Inventor.
D. Curell, per
Crane & Miller, attys.

(No Model.) 4 Sheets—Sheet 4.

D. CURELL.
CASH RECORDER AND CHECK PRINTER.

No. 499,660. Patented June 13, 1893.

Attest:
L. Lee.
Edw. T. Kinsey.

Inventor.
D. Curell, per
Crane & Miller, Attys.

UNITED STATES PATENT OFFICE.

DANIEL CURELL, OF BROOKLYN, NEW YORK.

CASH-RECORDER AND CHECK-PRINTER.

SPECIFICATION forming part of Letters Patent No. 499,660, dated June 13, 1893.

Application filed June 9, 1892. Renewed May 10, 1893. Serial No. 473,737. (No model.)

*To all whom it may concern:*

Be it known that I, DANIEL CURELL, a subject of the Queen of Great Britain, residing at Brooklyn, Kings county, New York, have invented certain new and useful Improvements in Portable Cash-Check Machines, fully described and represented in the following specification and the accompanying drawings, forming a part of the same.

This invention relates to machines in which a cash check is printed and cut off at each actuation, and the object of the invention is to simultaneously print the amounts of the checks in succession upon a record strip, which thus preserves an account of all the checks and is adapted to compare with a series of the checks at any subsequent time. The strip from which the checks are formed is moved forward the length of one check and cut off at each actuation of the machine, but the record strip is moved forward only a sufficient distance, say a quarter of an inch, to have the amounts printed successively close together, and such strip is preferably wound upon a barrel within the machine, which furnishes the means of feeding the strip as desired.

The machine is very light and compact and therefore portable, and thus adapted to carry without inconvenience to any place where its use is required.

The invention will be understood by reference to the annexed drawings, in which—

Figure 7:
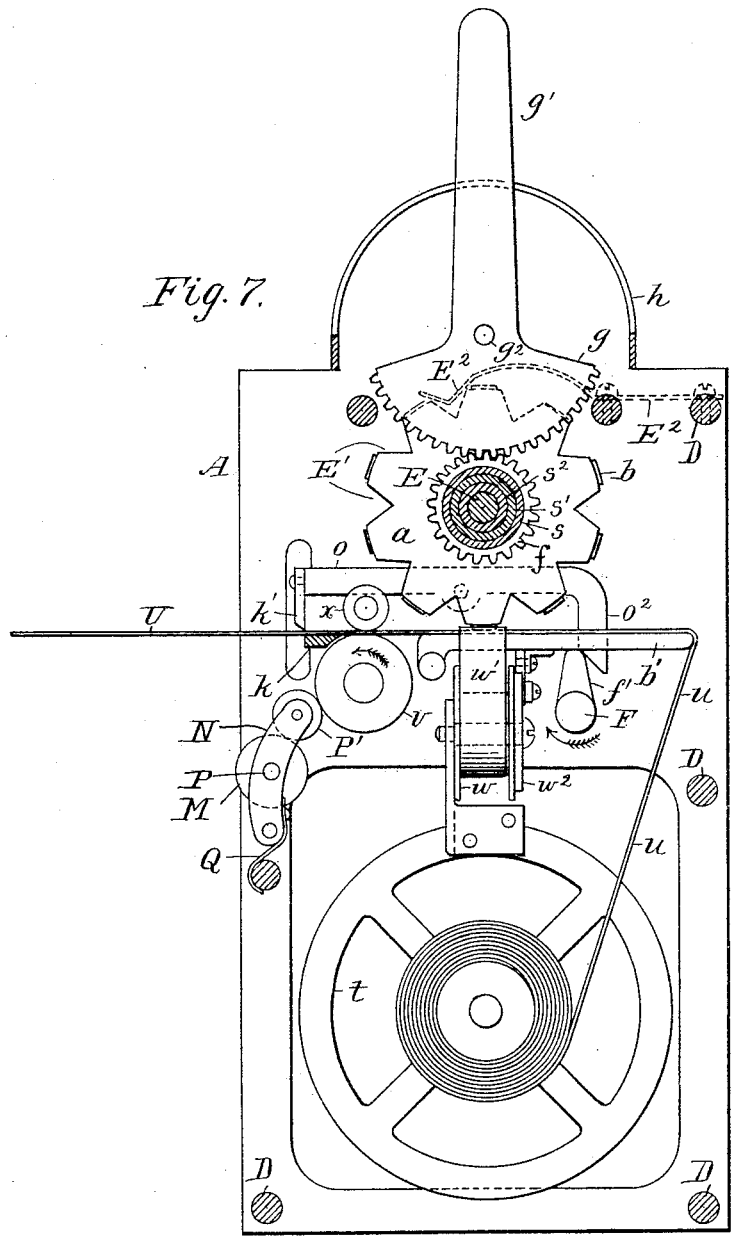
Figure 10:
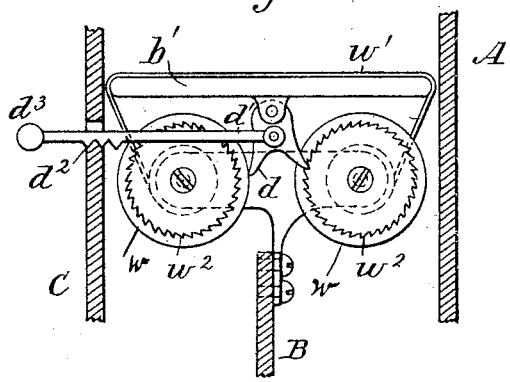
Figure 11:
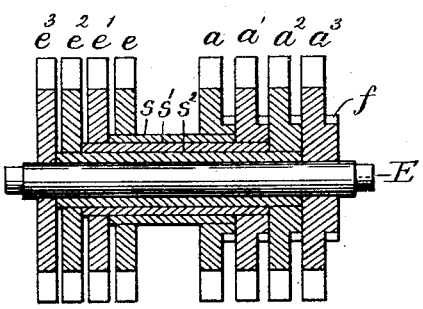
Figure 12:
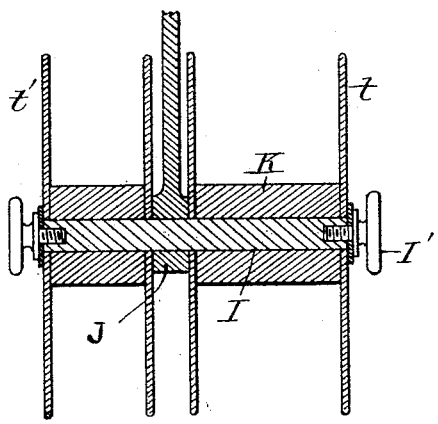

Figure 1 is a front elevation of the apparatus. Fig. 2 is a rear elevation of the same; Fig. 3 a plan; Fig. 4 a cross section on line $x$, $x$, in Fig. 2, with the pawl for the winding barrel removed, and the paper strips shown in position. Fig. 5 is a cross section on line $y$, $y$, in Fig. 2, with the feed roll, the platen, and the paper spools omitted to exhibit the cam shaft, the winding drum, and the cut off apparatus. Figs. 1 to 6 inclusive are drawn upon a smaller scale than the other figures. Fig. 6 is an end view of the cam shaft and the winding barrel, with the eccentric and pawl connecting the same. Fig. 7 is an elevation similar to Fig. 2, with the plates $b$ and $c$ removed, as well as the parts between the same. Fig. 8 is an edge view of the machine looking toward the right hand side of Fig. 1, and Fig. 9 is an edge view of the opposite side. Fig. 10 is a vertical section of the platen and the ribbon feeding devices with the adjacent parts of the outer plates. Fig. 11 is a longitudinal section of the number-disks, and Fig. 12 is a longitudinal section of the paper spools and their stud bearing.

The apparatus is illustrated with a frame consisting of three flat plates A, B, C, secured by tie-bars D. A spindle E is inserted through the upper part of the plates, and carries two sets of number-disks arranged upon opposite sides of the plate B. The disks in one set are lettered $a$, $a'$, $a^2$, $a^3$, beginning with the disk adjacent to the plate B; and the disks in the other set, beginning in the same manner, are lettered $e$, $e'$, $e^2$, $e^3$. The disks $a^3$ and $e^3$ are secured to the spindle E. The disks $a^2$ and $e^2$ are secured upon the opposite ends of a sleeve $s^2$ fitted to turn upon such spindle. The disks $a'$ and $e'$ are secured upon the opposite ends of a still larger sleeve $s'$ adapted to turn upon the sleeve $s^2$, and the disks $a$ and $e$ are attached to a sleeve $s$ fitted over the sleeve $s'$. The periphery of each disk is provided with ten seats having characters $b$, from 0 to 9, formed thereon, and a platen $b'$ is hinged to the plates A and C by pivots adjacent to the under sides of the disks. A cam shaft F is fitted to the same plates beneath the platen and provided with a cam $f'$ to press the platen toward the disks. Two wheels $w$ for the ink ribbon are pivoted beneath the platen and a ribbon $w'$ is attached to the same and extended transversely across the platen beneath the centers of the disks. Two paper spools $t$, $t'$, are pivoted beneath the platen, and strips of paper from such spools are drawn up over the platen and extended along the same beneath the ink ribbon, as shown at $u$, $u'$, in Fig. 4. In this figure all the parts above the platen are removed, to show the impressions produced upon the two strips of paper by the printing devices. Two groups of numbers, 2, 5, 6, 9, are shown imprinted upon the paper strip, in reverse order, over the strips $u$, $u'$, and the paper strip $u$ is shown projected over a feed roll $v$ sufficiently to cut off a check U beyond the edge of a cutter bar $k$ (Figs. 4 and 7). An elastic roll $x$ is pivoted in the plates A and B over the roll $v$ to press the paper strip thereon. The paper strip $u'$ is shown wound upon a barrel $t'$ having a ratchet-wheel $t^2$ at one end.

The disks lettered $a$ to $a^3$ are provided with cog-wheels $f$, and segments $g$ having hand-levers $g'$ are fixed upon a pivot $g^2$ over the disks to bring any desired character upon the paper strip. The platen, when actuated, presses the paper and ink ribbon toward the disks, thus printing upon the paper as desired. The hand-levers project through slots $h'$ in an arch $h$, which is provided, as shown in Fig. 3, with a numbered index at one side of each slot, indicating the character at the printing point when the lever $g'$ is turned to a corresponding character upon the index. The setting of the disk $a^3$ operates simultaneously to set the disk $e^3$ which is connected to it by the spindle E, and corresponding numbers or characters are formed upon the same sides of such disks so as to impress the same number or character upon the paper strip simultaneously. In like manner, the setting of the disk $a^2$ operates to set the disk $e^2$ in a corresponding position, by means of the connecting sleeve $s^2$; and in like manner with the disks $a$, $a'$, and $e$, $e'$, connected by the sleeves $s$ and $s'$. As the sleeves operate to couple the disks together which are nearest to one another in each set, the numbers upon the disks in the two sets are necessarily arranged in reverse order, and the numbers are therefore printed upon the two strips of paper in reverse directions, as is clearly shown in Fig. 4.

The cam-shaft is provided with a hand crank G having a spring stud H in its outer end adapted to make a contact with a stop H' upon the plate C, and thus to secure an exact rotation of the cam shaft when the crank is turned.

The stud is provided with knob $h^2$ by which it may be withdrawn to pass the stop at the beginning of each rotation. The cam shaft is provided, upon the end, with a gear $v^2$ of suitable diameter for thirty-six teeth, and the feed roll $v$ is provided with a cog-wheel $v'$ of thirty teeth meshing therewith. Six teeth are removed from the periphery of the wheel $v^2$, forming a blank space $v^3$, and leaving a sufficient number of teeth upon such wheel to turn the feed roll a complete rotation at each revolution of the crank G. A spring catch is provided to arrest the wheel $v'$ at the end of each rotation, consisting in a spring $m$ and conical pin $m'$ pressed into a hole inside of the wheel $v'$. See Fig. 8. A vibrating knife $k'$ is provided adjacent to the cutter bar $k$ to sever a check from the paper strip $u$; the knife being actuated while the blank space $v^3$ is moving adjacent to the wheel $v'$ and the feed roll $v$ is stationary. The platen is at the same time raised to print the desired impression upon both the paper strips, as shown in Fig. 7.

The frame carrying the knife is shown in Fig. 5, consisting in the arms $o$ and $o'$, pivoted to the plates A and B, with a toe $o^2$ extended from the arm $o$ to rest upon the end of the cam $f'$. The cam and toe are so adjusted as to actuate the knife during the printing impression, and to thus sever the checks U while the strip $u$ is being printed. In the same figure, an eccentric $p$ is shown attached to the opposite end of the cam shaft with a pawl $l$ fitted thereto and operating upon the ratchet wheel $l^2$ upon the winding barrel $l'$.

The eccentric is adjusted in relation to the cam, as shown in Fig. 6, to retract the pawl during the printing operation, and to rotate the barrel $l'$ simultaneously with the rotation of the feed roll $v$; so that both the paper strips are fed forward simultaneously, and are thus adapted to be printed simultaneously by the next upward movement of the platen.

The ink ribbon wheels $w$ as shown in Fig. 10, are provided respectively with reverse ratchet wheels $w^2$, and a duplex pawl $d$ is pivoted to the under side of the platen and held at pleasure in contact with either of the ratchet wheels. The downward movement of the platen at each rotation of the cam $f'$ carries the pawl downward, and the pawl having one of its teeth in contact with one of the adjacent ratchet wheels $w'$, for instance, that on the right hand side as shown in Fig. 10 gives it a forward movement and thus winds up a portion of the ribbon and gradually transfers it from one spool to the other. The movement of the ribbon is reversed by shifting the pawl so that the opposite tooth engages its adjacent ratchet wheel. This is effected by a rod $d'$ pivoted to the pawl and extended through the plate $c$ with a handle $d^3$ upon the end of the rod to actuate the same. The aperture through the plate is formed with a wedge-shaped corner beneath the rod, and locks $d^2$ are formed upon the under side of the rod to engage such corner, and thus retain the rod in the position in which it is placed. The operator may thus cause the wheels to rotate in one direction or the other, and thus to reverse the movement of the ribbon across the platen when desired, to renew the inking surface.

The stud I which carries the paper spools $t, t'$, is supported at its middle by a stud bearing J upon the plate B, and the spools may thus be readily removed from the opposite ends of the stud. The spools are formed of central hubs K with flanges at the opposite ends of the same, and thumb screws I' are tapped into the ends of the stud by which the outer flange may be removed at pleasure to insert a roll of paper when desired.

In Figs. 3, 7, and 9 a spring $E^2$ is shown attached to certain of the tie-bars D which hold the frame plates together, and the free end of the spring is slit into tongues each of which is bent to fit angular notches E' which are formed between the different characters $b$ upon the periphery of the number disks. The spring is shown in Figs. 3, 7 and 9 as applied to the number disks $e$ to $e'$ inclusive, but the relation of the spring to the notches in the disks is indicated diagrammatically by the dotted lines E² in Fig. 7, although only the disks $a$ to $a^3$ would be contained in such figure. Such spring is readily crowded out of the notches by the rotation of the disk under the action of the hand-lever $g'$, but serves to set the disk accurately with a number over the printing point when the movement of the hand-lever ceases.

It will be noticed in Fig. 7 that the feed roll $v$ is applied to the opposite side of the strip $u$ from the disks, and the surface of the feed roll may therefore be utilized to print an advertisement or design of any kind upon the under side of the cash check. This is effected by engraving the surface of the feed roll in any suitable manner not shown in the drawings, to make a printed impression, and providing means for inking the roll. The means shown in Fig. 7 consists in a small swing frame N pivoted upon a stud P adjacent to the feed roll. The stud carries an inking roll M which may be made of felt or other material adapted to retain the ink, and the end of the frame is provided with a distributing roll P′ which rotates in contact with the inking roll and is pressed toward the feed roll by a spring Q operating at the other end of the swing frame.

Having thus set forth the nature of my invention, what I claim herein is—

1. In a cash check machine, the combination, with two sets of number-disks with means for adjusting the same, of a platen pivoted adjacent to the disks and supporting two paper strips beneath the said disks, a rotating shaft with cam to vibrate the platen, a knife to cut off one of the strips and a barrel to wind up the other, and connections with the cam shaft to actuate the knife and barrel intermittingly, as and for the purpose set forth.

2. In a cash check machine, the combination, with two sets of number-disks with means for adjusting the same, of a platen pivoted adjacent to the disks and supporting two paper strips beneath the said disks, a rotating shaft with cam to vibrate the platen, a knife to cut off one of the strips and a barrel to wind up the other, a feed roll for moving the strip to the knife with a cog-wheel attached thereto, and a cog-wheel upon the cam shaft with a portion of the teeth removed to actuate the feed roll intermittingly, as herein set forth.

3. In a cash check machine, the combination, with two sets of number-disks with means for adjusting the same, of a platen pivoted adjacent to the disks and supporting two paper strips beneath the said disks, a rotating shaft with cam to vibrate the platen, a knife to cut off one of the strips and a barrel to wind up the other, a feed roll for moving the strip to the knife with a cog-wheel attached thereto, a mutilated cog-wheel upon the cam shaft and a catch to arrest the feed roll at each complete rotation, substantially as herein set forth.

4. In a cash check machine, the combination, with a movable platen bearing two strips of paper, of two sets of number-disks to print upon such strips, two ribbon wheels below the platen with ratchet wheels thereon, a duplex pawl attached to the platen for operating upon either of said wheels, and a rod for shifting the pawl into contact with either wheel, substantially as herein set forth.

5. In a cash check machine, the combination, with the plates A and B having the slotted and indexed arch $h$ at the top, of the plates C, with the bars D to connect the several plates, the spindle E with number-disks $e^3$ and $a^3$ thereon, the sleeves $s$, $s'$ and $s^2$, with the number-disks thereon, and the plate B arranged between the two sets of disks, the cog-wheels $f$, segments $g$, and hand levers $g'$ projected through the arch $h$, the platen $b$ hinged to the plates A and C and supporting separate paper strips beneath the two sets of disks, and means substantially as described for feeding the paper, and actuating the platen to press the same toward the disks, as and for the purpose set forth.

6. In a cash check machine, the combination, with the plates A, B, C and ties D to unite the same, of the shaft E and platen $b$ journaled to the plates A and C, two sets of number-disks mounted upon the spindle, with means for setting the disks as desired, the stud I supported at its middle by the bearing J upon plate B under the platen to receive two paper spools upon its opposite ends, and means for feeding the paper strips over the platen and pressing the platen toward the number-disks, as and for the purpose set forth.

7. In a cash check machine, the combination, with two sets of number disks, with means for adjusting the same, of a platen pivoted adjacent to the disks and supporting two paper strips beneath the said disks, a rotating shaft with cam to vibrate the platen, a knife to cut off one of the strips and a barrel to wind up the other, the feed roll $v$ having an engraved surface applied to the strip upon the opposite side from the number disks, and operating to move the strip to the knife, a cog wheel attached to such feed roll, a cog wheel upon the cam shaft with a portion of the teeth removed to actuate the feed roll intermittingly, and the swing frame N provided with the inking roll M and carrying the distributing roll P′ in contact with the engraved feed roll, as herein set forth.

In testimony whereof I have hereunto set my hand in the presence of two subscribing witnesses.

DANIEL CURELL.

Witnesses:
 JOSEPH M. STOUGHTON,
 T. S. CRANE.